United States Patent [19]

Prince

[11] Patent Number: 5,092,721

[45] Date of Patent: Mar. 3, 1992

[54] DOUBLE DROP TRAILER WITH TWO LIFTS

[75] Inventor: Dayton E. Prince, Anchorage, Ak.

[73] Assignee: Coterie, Ltd., Soldotna, Ak.

[21] Appl. No.: 621,266

[22] Filed: Dec. 3, 1990

Related U.S. Application Data

[60] Division of Ser. No. 544,043, Jun. 23, 1990, Pat. No. 4,997,335, which is a continuation of Ser. No. 276,638, Nov. 28, 1988, abandoned.

[51] Int. Cl.$^5$ .................................................. B60P 1/02
[52] U.S. Cl. ....................................... 410/26; 105/370; 296/25; 414/495; 414/679
[58] Field of Search ............... 414/495, 496, 497, 594, 414/539, 540–542, 544, 545, 679, 249, 264; 296/25; 105/370, 375; 187/9 R; 410/26, 28, 28.1, 27, 29.1

[56] References Cited

U.S. PATENT DOCUMENTS

| | | | |
|---|---|---|---|
| 2,146,203 | 2/1939 | Demarest | 410/27 X |
| 2,606,508 | 8/1952 | Van Nes | 410/27 |
| 2,970,861 | 2/1961 | Short | 105/370 |
| 3,000,524 | 9/1961 | Bader | 410/26 |
| 3,119,350 | 1/1964 | Bellinger | 410/27 |
| 3,180,285 | 4/1965 | Gutridge | 410/27 |
| 3,516,706 | 6/1970 | Bruce | 105/370 |

FOREIGN PATENT DOCUMENTS

| | | | |
|---|---|---|---|
| 153032 | 8/1985 | European Pat. Off. | 410/27 X |
| 219151 | 4/1987 | European Pat. Off. | 410/26 |
| 155037 | 6/1986 | Japan | 414/495 |
| 0155037 | 7/1986 | Japan | 414/495 |
| 0911690 | 5/1961 | United Kingdom | 410/26 |
| 911690 | 11/1962 | United Kingdom | 410/26 |
| 1183818 | 3/1970 | United Kingdom | 410/26 |
| 8800538 | 1/1988 | World Int. Prop. O. | 414/495 |

OTHER PUBLICATIONS

"Two Tier Motor Car Transporter", The Railway Gazette, Mar. 14, 1958.

Primary Examiner—Frank E. Werner
Assistant Examiner—Brian K. Dinicola
Attorney, Agent, or Firm—William D. Hall

[57] ABSTRACT

A double drop trailer has a central storage or cargo section whose floor is at a lower level than the floors of the front and rear storage (cargo) sections. A first lift having upper and lower cargo platforms is located in the central cargo section, and a second lift is located in the rear section. The first lift is initially positioned so that its lower platform is level with the floor of the front section. Cargo is then moved through the rear door, through the rear section, across the lower storage platform of the first lift and placed on the floor of the front section. More cargo is then moved through the rear door and placed on the lower storage platform of the first lift. The first lift is then lowered. Additional cargo is then moved through the rear door onto the second lift and this lift is thereafter raised permitting this cargo to be placed on the upper storage platform of the lift. Finally, more cargo is moved through the rear door and loaded into the rear section of the trailer.

8 Claims, 3 Drawing Sheets

DOUBLE DROP TRAILER WITH TWO LIFTS

RELATED APPLICATIONS

This application is a division of my prior copending application Ser. No. 07/544,043, filed June 23, 1990, now U.S. Pat. No. 4,947,335 which application is a continuation of my earlier application Ser. No. 07/276,638, filed Nov. 28, 1988, now abandoned.

BACKGROUND OF THE INVENTION

Four types of trailers in common use are as follows:

1. The straight trailer is the most widely used. It has one level floor and the same dimension throughout. The straight trailer uses standard loading docks, maximum wheel size for long hauls and heavy loads with standard equipment.

2. The wedge trailer is the second most popular. The floor angles down increasing the cubic feet of load space. The angle is not too steep for the standard fork lift to transverse. This trailer uses standard loading docks, loading equipment and maximum size wheels.

3. The single drop trailer is the third most widely used. It has more cubic feet of load space than the straight or wedge trailer. To accomplish the drop for increased volume the trailer uses smaller wheels. The smaller wheels are not good for long distance or heavy loads. Special conveyors or ramps are needed to load from a standard dock. The split level adds to the difficulty in loading.

4. The double drop trailer has received limited use except in the furniture moving industry. It is capable of having the most cubic feet of load space. In spite of its space, weight and long haul advantage its disadvantages prevent it from wide use. Its two separate floors require special conveyor systems, ramps, manual handling of freight, or special loading docks for side loading.

The use of hydraulic rams to raise a platform in a trailer is old and is shown in European Publication 153,052 of Aug. 24, 1985. The subject matter of this publication, does not, however, solve the above-named problems that are involved in double drop trailers.

It is a primary object of this invention to increase the utility of double drop trailers.

SUMMARY OF THE INVENTION

The invention provides improved loading apparatus for double drop trailers. The double drop trailer is an old and well known form of trailer; having front, central and rear cargo sections. The front and rear cargo sections are usually over the wheels and the floor of these sections is therefore higher than the floor of the central cargo section. The rear section is provided with a rear door.

The present invention adds two lifts to the double drop trailer. The first lift comprises upper and lower cargo supporting elements or platforms rigidly interconnected, one above the other by a distance sufficient to allow passage of workmen therethrough and also sufficient to receive cargo carrying containers. Hydraulic rams raise and lower the first lift under control of the operator. The operator will raise or lower the first lift so that its lower cargo supporting elements are about on the same plane as the front and rear sections. The workmen can then move cargo carrying containers through the rear door, through the rear section, across the lower cargo supporting elements of the first lift and onto the floor of the front section. Thereafter, further cargo containers may be moved by the workmen and placed on the lower supporting elements of the first element. The first lift is then lowered. Further cargo carrying containers are then placed on a second lift located in the rear section. This lift then is operated to raise these further containers to a sufficient height that they may be transferred to the upper cargo supporting elements of the first lift. The second lift may then be lowered and may be filled with cargo to thus fully load the rear section of the trailer. The trailer is now ready for transporting the containers to their desired destination at which the trailer is unloaded by a method which is exactly the reverse of the method used for loading the trailer.

The above loading method allows all loading and unloading to take place through the rear door and therefore side doors are unnecessary.

The floors of said front and rear cargo sections are substantially closer to ground than to the roof of the trailer.

DETAILED DESCRIPTION OF THE INVENTION

Figure 1:
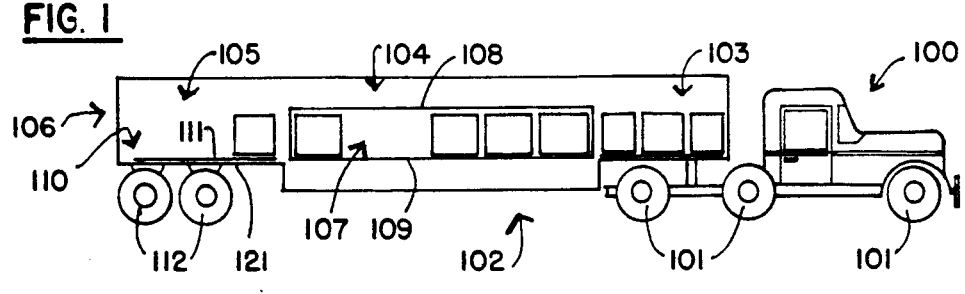
FIG. 1 is a cut-away side view of a partially loaded trailer according to the invention.

FIG. 1 illustrates a truck 100, having wheels 101, pulling a double drop trailer 102. Trailer 102 has a front section 102 (often called a goose neck), a central section 104, and a rear section 105 having a rear door 106. As is typical of prior art double drop trailers, central section 104 extends much lower (closer to the ground) than the front and rear sections 103 and 105.

Figure 2:
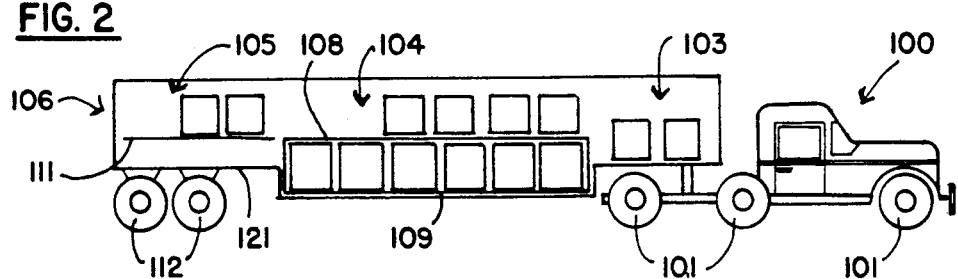
FIG. 2 is a cut-away side view of a trailer as to which the loading method is further along than in the case of FIG. 1.
Figure 3:
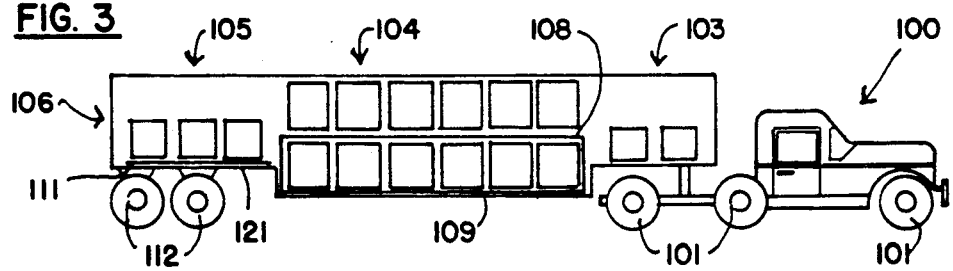
FIG. 3 is a cut-away side view of a trailer which is almost, but not quite, fully loaded.

The central section 104 has a hydraulic lift 107 having an upper cargo carrying surface 108 and a lower cargo carrying surface 109. The two surfaces 108 and 109 are rigidly secured together; and the vertical space between them is adequate to store containers between them (as shown in FIGS. 1 to 3) and is preferably large enough to allow workmen with containers to move between them.

A lift 110 is located in rear section 105. The lift 110 has a lifting surface 111 normally resting on the floor 121 but which may be elevated as shown in FIG. 2.

The lifts 107 and 110 are power driven, that is some form of motors (for example hydraulic rams) drive the lifts.

Rear wheels 112 are located under rear section 105.

The foregoing equipment insofar as pertinent to my invention is described in greater detail hereafter. The method of loading and unloading the trailer will, however, be described first, with reference to FIGS. 1 to 3 since such a description will enable a better understanding of the details hereinafter described.

All loading and unloading of the trailer takes place through rear door 106. Before loading begins the lift 107 is raised until the cargo carrying surface 109 is level with the floors of front and rear sections 103 and 105. Cargo carrying containers are first moved through rear door 106, rear section 105, across lower cargo carrying surface 109 and onto the floor of front section 103. Further cargo carrying containers are then moved through the rear door 106, through rear section 105 and onto lower cargo carrying surface 109 until surface 109 is full of containers. The lift 107 is then lowered until the bottom surface of lower cargo carrying surface 109 rests on the floor of central section 104. Next further containers are moved through rear door 106 onto the lifting surface 111 following which lift 111 is raised to the level of cargo carrying surface 108 at which time the containers are moved from the lift 111 onto upper cargo carrying surface 108 of lift 107 as shown in FIG. 2. It may be that the lift 111 may be required to carry more than one load of containers in order to fill the upper surface 108. Next, lift 111 is lowered and rear section 105 is filled with containers as shown in FIG. 3. The truck is now loaded and ready to move the cargo to its destination.

At the destination, the truck is unloaded in a manner that is just the reverse of the loading method, namely all unloading is through the rear door 106. First, the rear section 105 is unloaded. Secondly, the upper cargo carrying surface 108 is unloaded via lift 111. The lift 107 is then raised to bring cargo carrying surface 109 to the same level as the floors of front and rear sections 103 and 105 as shown in FIG. 1. The containers on cargo carrying surface 109 are then unloaded through rear door 106, followed by the unloading of front section 103.

Figure 4:
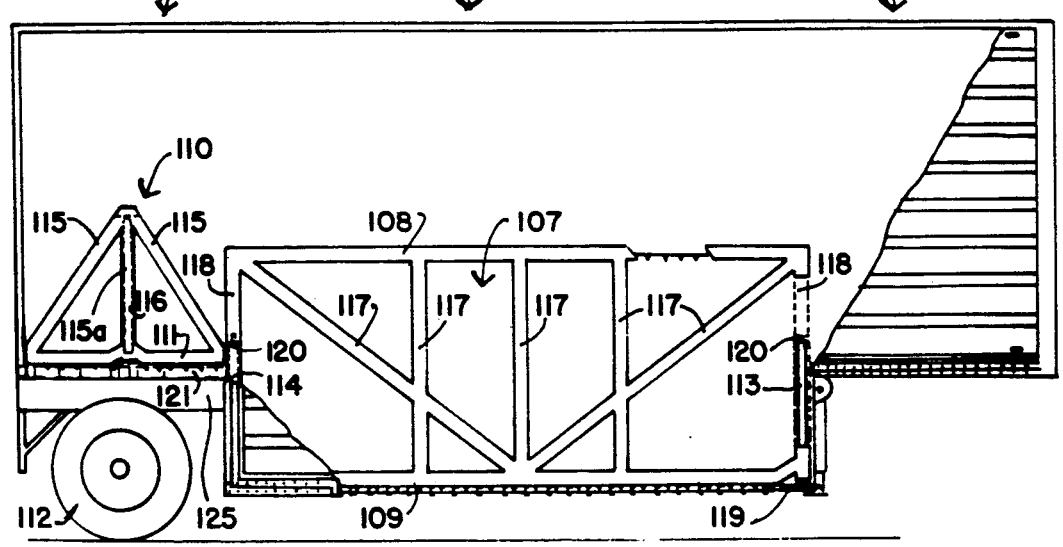
FIG. 4 is a cut-away side view of a trailer embodying the invention.

FIG. 4 illustrates further details of lifts 107 and 110. Lift 107 has its upper cargo carrying surface 108 in the form of a floor or platform supported by braces 117 and 118 from the lower cargo carrying surface 109. Supporting braces 118 are partly hollow below line 120 and have hydraulic driven rams 113 and 114 in them for raising the lift 107. Each hydraulic ram has a base portion such as 119 on the floor of central section 104. The rams 113 and 114 move upward, under control of the human operator, and move the braces 118 upwardly pressing against the solid portions of braces 118 beginning at line 120.

The lift 107, is therefore, a rigid structure having a space between cargo carrying surfaces 108 and 109 sufficient to allow containers to be conveniently moved through the structure for placement on the floor of front section 103. The cargo carrying surfaces 108 and 109 may be in the form of a floor, a platform, rollers, a number of slats or even a heavy wire mesh capable of serving the purpose of supporting the cargo and allowing workmen to pass across the same.

The lift 110 includes a floor, platform, slats, rollers or heavy wire, cargo supporting surface 111. On each side of the truck there is a triangular frame 115 extending above the lifting surface 111 and secured thereto. The central support 115a is hollow so that hydraulic ram 116 may pass therethrough. When the human operator operates the controls to raise lift 110, the ram 116 pushes the triangular support 115 upwardly carrying the lifting surface 111 with it. Hydraulic ram 116 is mounted on the trailer floor 121 and extends upwardly therefrom, so that as the ram 116 elongates it raises the lift 110 the desired amount above the trailer floor.

Figure 5:
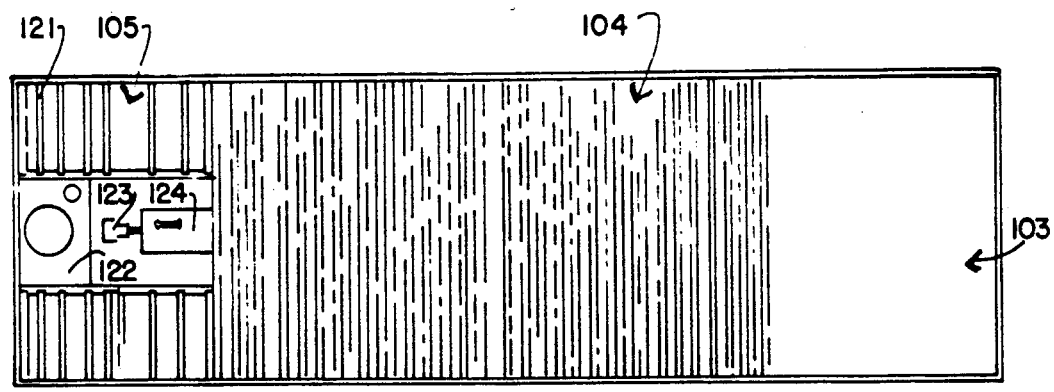
FIG. 5 is a broken top view of the floors of the trailer with a portion of the floor of the rear section cut away to show the hydraulic fluid reservoir and the pump.

FIG. 5 illustrates a portion of the floor 121 of the rear section 105 cut away to show the location of the hydraulic fluid reservoir 122, the hydraulic pump 123 for keeping normal fluid pressure in reservoir 122 and pump motor 124 for driving the pump 123.

The reservoir 122 is connected with pipes (not shown) to the hydraulic rams 113, 114 and 116. Control valves in said pipes may be employed to allow the human operator to operate the rams in the desired manner. The controls are not illustrated since such devices are well known in the art.

Figure 6:
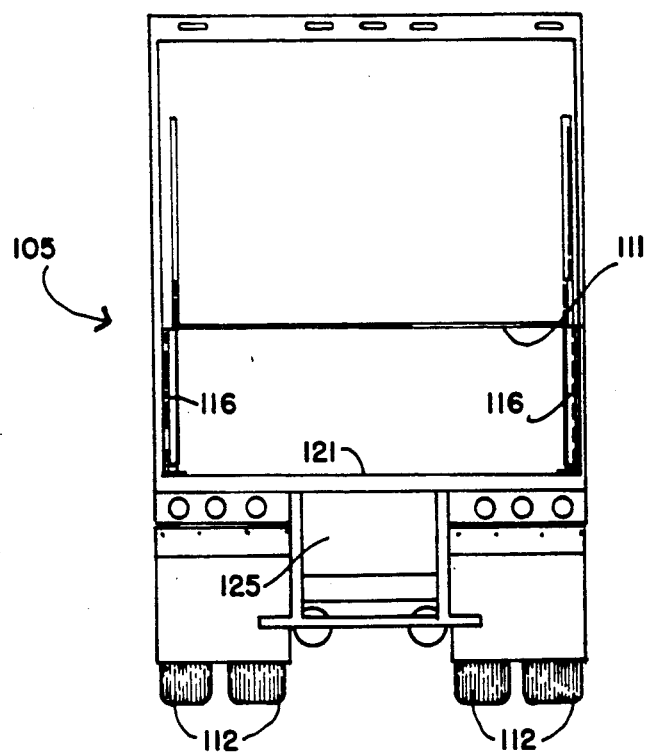
FIG. 6 is a rear view of the trailer with the rear door omitted.

FIG. 6 is a rear view of the trailer with the rear door 106 removed. The lift 110 is in the raised position. The reservoir 122, the pump 123 and the motor 124 are located in control box 125 below rear section 105.

Figure 7:
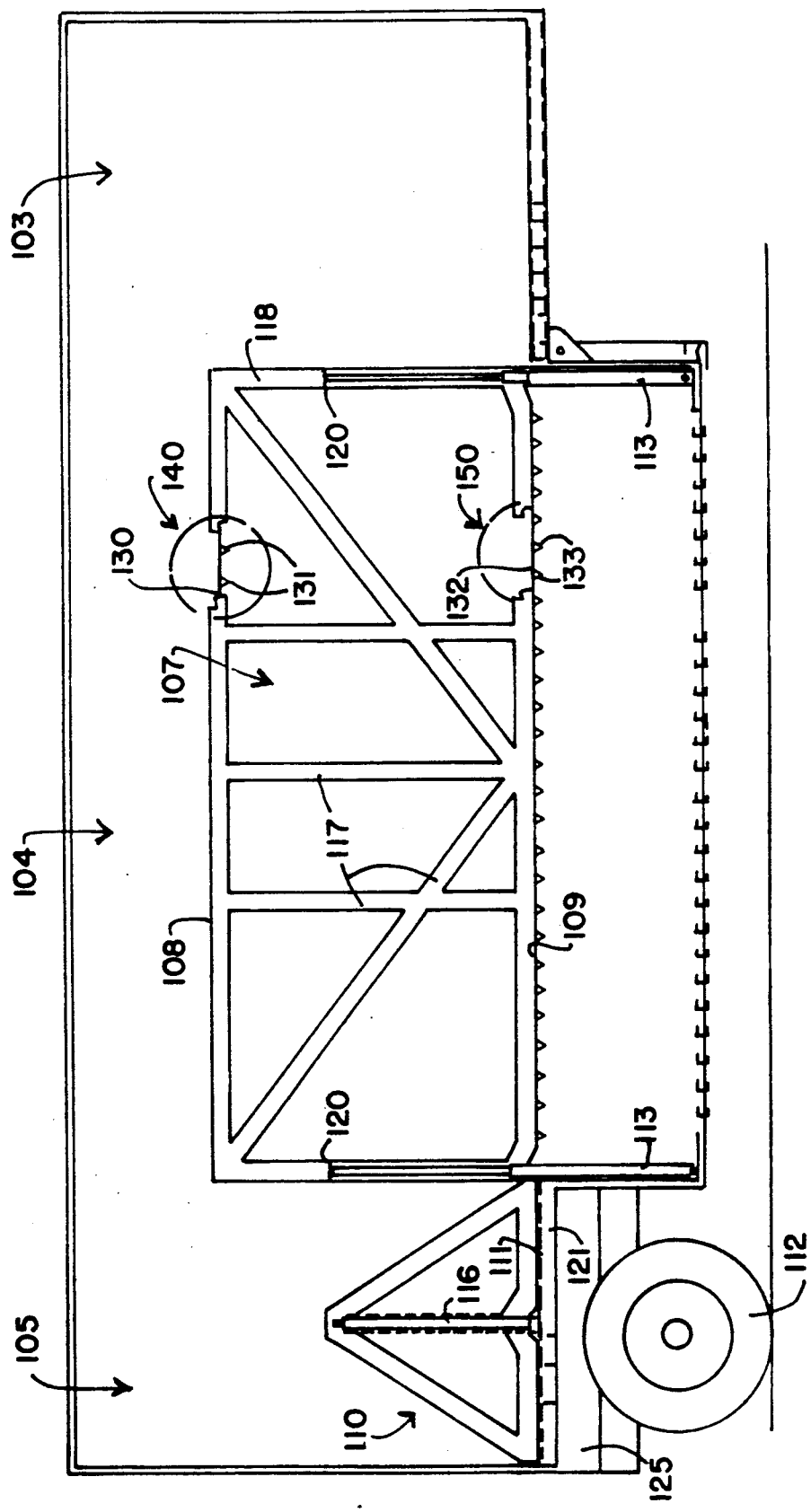
FIG. 7 is a side view of the trailer with the sidewalls omitted.

FIG. 7 is a side view of the main elements of the invention with lift 107 in raised condition. The upper cargo carrying surface 108 has a cut-away 140 in which the floor boards 130 with cross braces 131 are shown. Similarly, the lower cargo carrying surface 109 has a cut-away 150 in which the floor boards 132 with cross braces 133 are shown.

It is apparent from the foregoing that my invention has a number of advantages such as the following:
1. The capacity of the double drop trailer is increased.
2. No side doors are necessary on the trailer.
3. The trailer may use large wheels for long hauls and heavy load.
4. Provides a continuous level floor from the rear to the front of a double drop trailer for easy access to the front section.

I claim to have invented:
1. A double drop trailer, comprising:
   front and rear cargo sections each having support means at about the same given level with respect to one another for supporting cargo,
   said trailer having a rear door,
   a central cargo section which extends lower than either of the front and rear cargo sections,
   a lift in said central section, said lift having upper and lower cargo supporting elements for supporting cargo thereon, mounting means for said upper and lower supporting elements, said upper and lower cargo supporting elements being fixedly mounted relative to one another in a spaced vertical relationship,
   said lift including elevating means for raising said cargo supporting elements at least high enough that said lower cargo supporting element is at about said given level, so that cargo may be moved through said rear door, across said support means of said rear section, across said lower cargo supporting element and into said support means of said front section, and so that cargo can also be moved through said rear door and loaded on said lower cargo supporting element, said elevating means including means for lowering said lift means to place any cargo on said lower cargo supporting element at least partially below said given level and for raising said lift while said lower cargo supporting element is loaded with cargo, and
   an additional lift having a supporting surface in said rear section and including power driven means for raising cargo placed on said supporting surface to a level at which such cargo may be placed on said upper cargo supporting element.

2. A double drop trailer as defined in claim 1 in which said trailer has sidewalls free of doors.

3. A double drop trailer as defined in claim 1 in which said lifts are hydraulic lifts.

4. A double drop trailer as defined in claim 3 having a hydraulic fluid reservoir and a pump for placing the fluid under pressure, said reservoir and pump being located under said rear section.

5. A double drop trailer as defined in claim 1, comprising:
- a roof, located above said front and rear cargo sections, for said double drop trailer,
- wheels for running on the ground and for at least partly supporting said double drop trailer,
- each of said front and rear cargo sections having a cargo supporting surface located substantially closer to said ground than to said roof,
- said lift means including means for maintaining said upper cargo supporting element below said roof, during the entire period during which the trailer is loaded.

6. A double drop trailer comprising:
- a front cargo support,
- a rear cargo support,
- a central cargo storage location,
- a rear door,
- first means having upper and lower cargo supporting means, located in said central cargo storage location, each of said upper and lower cargo supporting means comprising means for supporting cargo,
- said upper and lower cargo supporting means being fixedly mounted relative to one another in a space vertical relationship, said lift means comprising mounting means for said upper and lower cargo supporting means,
- said front and rear cargo supports being at a lower level than said upper cargo supporting means, said lift means comprising elevating means for positioning the lower cargo supporting means to allow movement of cargo from the rear door across said rear cargo support and the lower cargo supporting means to said front cargo support,
- first power driven means for lowering said lift means, while said lower cargo supporting means is loaded, to position said lower cargo supporting means at a level lower than the levels of both of said front and rear cargo supports and for raising said lift means, while said lower cargo supporting means is loaded, and
- second power driven means, including a supporting surface in the trailer and adjacent said rear door for raising cargo that has passed through said rear door, so that such cargo can be stored on said upper cargo supporting means.

7. A double drop trailer as defined in claim 6, comprising:
- a roof, for said double drop trailer, located above said lift means,
- said front cargo support and said rear cargo support being located substantially closer to the ground than to said roof,
- said upper cargo supporting means having its fully raised position below said roof.

8. A double drop trailer as defined in claim 6 wherein said second power driven means comprises means for raising said supporting surface to a level which is substantially the same as the level of said upper cargo supporting means when said first lift means has moved said lower cargo supporting means to said level which is lower than the levels of both of said front and rear cargo supports.

* * * * *